United States Patent
Ainslie et al.

(10) Patent No.: US 10,019,716 B1
(45) Date of Patent: Jul. 10, 2018

(54) METHOD FOR FEEDBACK SUBMISSION RESOLUTION

(71) Applicant: Google Inc., Mountain View, CA (US)

(72) Inventors: Alex Neely Ainslie, San Francisco, CA (US); Theodore Nicholas Choc, Palo Alto, CA (US); David Andrew Trainor, Sunnyvale, CA (US); Mihai Sardarescu, Issy les Moulineaux (FR)

(73) Assignee: Google LLC, Mountain View, CA (US)

( * ) Notice: Subject to any disclaimer, the term of this patent is extended or adjusted under 35 U.S.C. 154(b) by 1267 days.

(21) Appl. No.: 14/086,928

(22) Filed: Nov. 21, 2013

(51) Int. Cl.
 G06Q 10/00 (2012.01)
 G06F 7/00 (2006.01)
 G06F 17/30 (2006.01)
 G06Q 30/00 (2012.01)

(52) U.S. Cl.
 CPC .................................. *G06Q 30/016* (2013.01)

(58) Field of Classification Search
 USPC ....... 705/304; 707/706, 708, 737; 714/2, 26; 715/254; 348/254
 See application file for complete search history.

(56) References Cited

U.S. PATENT DOCUMENTS

| | | | | |
|---|---|---|---|---|
| 6,742,141 B1 * | 5/2004 | Miller | ................. | G06F 11/0748 706/45 |
| 6,778,995 B1 * | 8/2004 | Gallivan | ............. | G06F 17/3071 707/739 |
| 7,391,312 B2 * | 6/2008 | Murphy | .............. | G06F 11/0769 340/500 |
| 7,813,910 B1 * | 10/2010 | Poulin | ................. | G06F 11/3457 703/22 |
| 7,831,910 B2 * | 11/2010 | Liu | .................... | G06F 17/30011 707/738 |
| 7,865,455 B2 * | 1/2011 | Nickerson | .............. | G06Q 10/00 706/45 |
| 8,019,753 B2 * | 9/2011 | Podgorny | .............. | G06Q 10/10 707/722 |
| 8,032,508 B2 * | 10/2011 | Martinez | ........... | G06F 17/30867 707/602 |
| 8,078,604 B2 * | 12/2011 | Kurien | ................ | G06F 17/3089 707/706 |

(Continued)

OTHER PUBLICATIONS

AdminStudio ("Performing Automatic Issue Resolution." Jul. 9, 2012. http://helpnet.flexerasoftware.com/ adminstudio115/Content/ashelplibrary/ISCS TaskAutomaticallyResolveConflicts.htm.).*

(Continued)

*Primary Examiner* — Mark A Fleischer
*Assistant Examiner* — Johnathan J Lindsey, III
(74) *Attorney, Agent, or Firm* — McDermott Will & Emery LLP

(57) ABSTRACT

Techniques for expeditiously providing a resolution for an application feedback submission are provided. An example method includes displaying a feedback interface configured to receive a feedback report relating to a software application issue, providing the received feedback report for resolution, the resolution based on classification of one or more issue topics identified in the feedback report, and receiving the resolution as instructions to display an action button, the action button when selected by a user causing execution of an operation resolving the software application issue.

19 Claims, 5 Drawing Sheets

(56) References Cited

U.S. PATENT DOCUMENTS

| | | | | |
|---|---|---|---|---|
| 8,301,613 | B2* | 10/2012 | Grabarnik | G06Q 10/103 |
| | | | | 707/706 |
| 8,312,324 | B2* | 11/2012 | Foley | G03G 15/5079 |
| | | | | 706/20 |
| 8,621,278 | B2* | 12/2013 | Petukhov | G06F 11/0793 |
| | | | | 714/26 |
| 8,670,050 | B2* | 3/2014 | Xiong | G06K 9/6203 |
| | | | | 348/222.1 |
| 2008/0065577 | A1* | 3/2008 | Chefalas | G06F 8/70 |
| | | | | 706/47 |
| 2011/0043652 | A1* | 2/2011 | King | G06F 17/2211 |
| | | | | 348/222.1 |
| 2011/0296243 | A1* | 12/2011 | Calman | G06F 11/079 |
| | | | | 714/26 |
| 2012/0016877 | A1* | 1/2012 | Vadrevu | G06F 17/30696 |
| | | | | 707/737 |
| 2012/0272099 | A1* | 10/2012 | Keith, Jr. | G06N 5/04 |
| | | | | 714/26 |
| 2012/0317545 | A1* | 12/2012 | Chandra | G06F 9/4443 |
| | | | | 717/110 |
| 2015/0154193 | A1* | 6/2015 | Dave | G06F 17/30705 |
| | | | | 707/748 |

OTHER PUBLICATIONS

STIC 3600 NPL Search Generated Jan. 8, 2018. (Year: 2018).*
Admin Studio ("Performing Automatic Issue Resolution." Jul. 9, 2012. http://helpnet.flexerasoftware.com/adminstudio115/Content/ashelplibrary/ISCSTask AutomaticallyResolveConflicts.htm.).*

* cited by examiner

METHOD FOR FEEDBACK SUBMISSION RESOLUTION

FIELD

The present disclosure relates generally to software applications and particularly to providing feedback for such applications.

BACKGROUND

Applications, such as web browsers, commonly provide users a way to report issues associated with the applications. For example, if a web page rendered in a browser tab becomes unresponsive upon a user action, the user may report this issue by providing a description of the issue through a feedback form. Upon submission of a report describing the issue using the feedback form, the user typically receives a notification that the report was successfully submitted along with an optional link to a generic web-based help center or forum. However, the user may not be provided with solutions that may help the user to expeditiously resolve the issue.

SUMMARY

The disclosed subject matter relates to providing an actionable resolution for a software application feedback submission.

An example method includes receiving a feedback report relating to a software application issue, identifying one or more issue topics from the feedback report, classifying the feedback report based on the identified issue topics into a feedback cluster of one or more feedback clusters, the feedback clusters associated with respective resolutions for software application issues, retrieving one or more resolutions associated with the classified feedback cluster and providing the retrieved resolutions for the software application issue.

Another example method includes displaying a feedback interface configured to receive a feedback report relating to a software application issue, providing the received feedback report for resolution, the resolution based on classification of one or more issue topics identified in the feedback report, and receiving the resolution as instructions to display an action button, the action button when selected by a user causing execution of an operation resolving the software application issue.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The novel features of the subject technology are set forth in the appended claims. However, for purpose of explanation, several configurations of the subject technology are set forth in the following figures.

DETAILED DESCRIPTION

Figure 1:
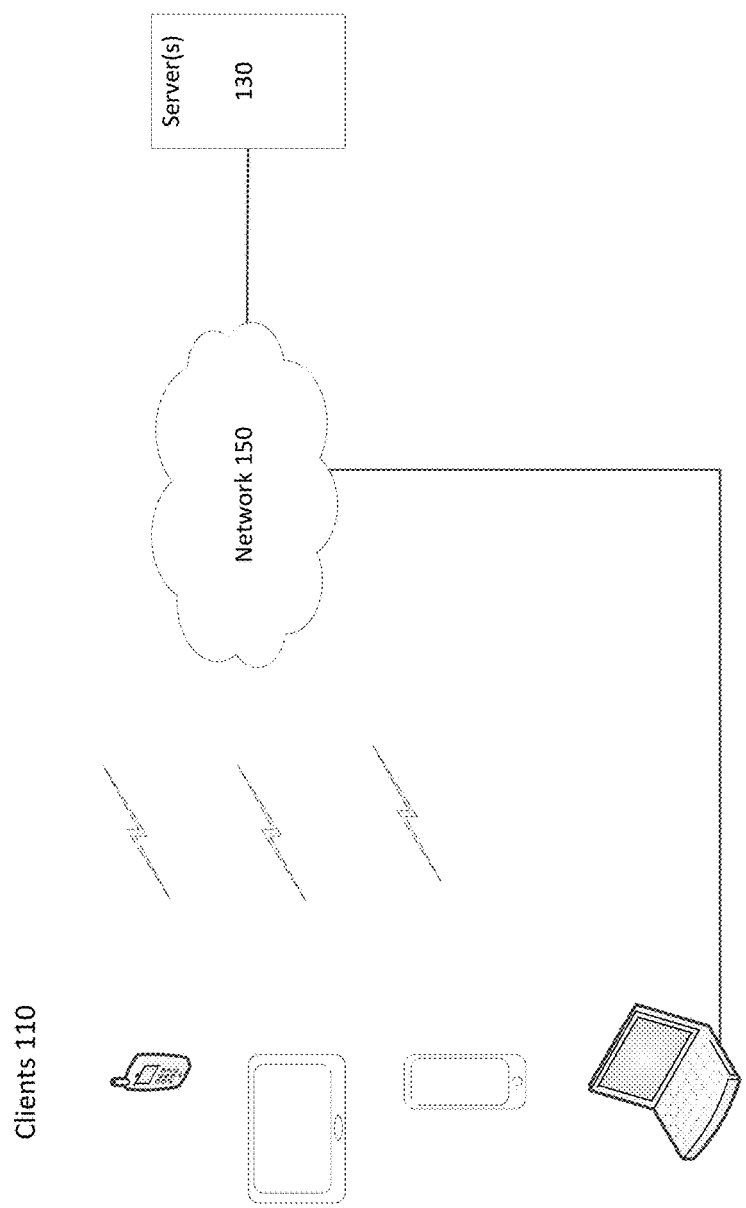
FIG. 1 is a diagram of an example network environment suitable for practicing an implementation of the subject technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

The disclosed subject matter relates to providing an actionable resolution for a software application feedback submission.

The disclosed system, which can be provided as a feedback submission menu within an application (e.g., a web browser), enables a user to report an application issue (e.g., malware, suspended responsiveness, etc.) and receive actionable resolutions that may be used by the user to resolve the issue. Users may also provide feature suggestions and complaints using the feedback submission menu.

In an example method, a feedback report relating to a software application issue is received by the disclosed system and one or more issue topics are identified from the feedback report. The feedback report is classified into a feedback cluster based on the identified issues. One or more resolutions are then provided for the application issue based on the classified feedback cluster. The one or more resolutions may include at least one of an action button that when selected by the user causes execution of an operation resolving the application issue, one or more instructions to resolve the issue and a link to a web-based help center that when selected by the user causes the application to render a help center page.

In some aspects, as resolutions for software application issues are provided, the resolutions are associated with one or more feedback clusters. In some aspects, existing resolutions that may be associated with a feedback cluster can be refined based on other existing resolutions or new resolutions. Such refinement may include, for example, association of the new resolutions with a feedback cluster, removal of existing resolutions or editing of existing resolutions. Feedback clusters may be kept current with resolutions for most recent or previously unknown issues that have been reported by users. Once resolutions for new or previous issues have been determined, these resolutions may be provided when the same or similar issues are reported again. In this way, aspects of the subject technology are able to suggest meaningful and current resolutions for software application issues reported by users.

A submitted feedback report for an application issue can include, for example, one or more of a feedback description, a system log, an application state log, an image or screenshot of the application and a summary of user device information.

A feedback description may include a typed, voice-recorded or video/visual description of a software issue experienced by a user. In an example, the feedback description may be a few lines typed by the user describing the issue (e.g., "Browser crashes when any webpage is visited and an image from the site is copied to the clipboard", "Streaming video player plays video files without audio," etc.).

A system log can include, but is not limited to, events that are logged by device operating system components. A system log may include information about device changes, device drivers, system changes, events, operations and any other data associated with device operation. A system information log can include any other operational information associated with the device, such as what hardware resources and features are supported by the device, a device identifier and any other device level information. An application state log may include information about application-related operations and any other data associated with the application of issue. A summary of device information may include a device platform identifier, device manufacturer name and a device operating system version and name.

The logs discussed herein may be retrieved from device memory (or remote memory) for any time range or duration. For example, one or more logs may be retrieved for a time period close to a time associated with an application issue or even from the time when the device began storing log information in memory. In another example, the logs may be retrieved for a time range specified by a user or specified by the disclosed system. In an example aspect, log retrieval from memory may be automatically initiated when a user selects a feedback submission menu.

Feedback can be submitted through a feedback form instantiated by selecting a feedback submission menu or a feedback reporting button provided by an application. Examples of applications for which feedback can be provided, may include, but are not limited to search engine clients, web browsers, streaming video service applications, map applications and any other application that may be provided to the user on a device. Some aspects of feedback other than the feedback description (e.g., a system log and screenshots) may be automatically included into the feedback by the user's device. Feedback may also include feature requests and complaints. Upon receipt of the feedback, the disclosed system identifies issue topics associated with the feedback and suggests actionable resolutions to the user.

A screenshot of the application may be automatically captured by the disclosed system at the time a user reports an application issue, an instant before the application terminates as a result of an issue or at any other time. Furthermore, the user may upload any screenshot(s) and/or screencasts that the user believes may be relevant to resolution of the issue. Additionally, the user may provide screenshots when submitting feature requests and complaints. A user may opt out of providing certain feedback information, such as screenshots, especially if the screenshots potentially include sensitive or private information. According to an aspect of the disclosure, the disclosed system analyzes at least one of feedback description keywords, the system log, the application state log, the image or screenshot of the application and the summary of device information. The analysis can include review or parsing of one or more words or images to identify one or more keywords. In an aspect, pixel and parameter values in the images may be parsed or reviewed to later determine other similar images that may reside in a feedback cluster. From this analysis of submitted feedback, the disclosed system can determine issue topics that are used to automatically classify the submitted feedback into a feedback cluster. The feedback cluster can include similar issues, such as those reported by other users, along with their respective identified issue topics and resolutions. In one example aspect, issues that have similar identified issue topics may be classified into one feedback cluster. Based on the classification discussed above, the disclosed system suggests a resolution for an application issue reported by the user.

According to an aspect of the disclosure and in one scenario based on the classification, a suggested resolution may include an action button that when selected by the user causes the application to execute an operation immediately resolving the issue. Such an action button can be provided when the operation to resolve the issue is integrated within and available to the application. The suggested resolution may include one or more instructions to display the action button in a user interface of the application or at any other location outside the application. In some aspects, selection of the action button may directly resolve the issue based on functions (e.g., clear browsing data functions) integrated within the software application and may not cause download of additional software to resolve the issue. In another scenario based on the classification, a suggested resolution can include one or more instructions (e.g., a step-by-step guide) to resolve the issue. A step-by-step guide may be provided when a resolution may not be directly accessible through an action button. In yet another scenario based on the classification, the suggested resolution can include a link to a web-based help center or forum page related to the application that caused the issue. Such a link may be provided when an action button and a step-by-step guide to resolve the issue may not available or applicable.

As an example, the type of suggested resolution (e.g., action button, step by step instructions or help center link) is based on existing feedback resolutions available in a feedback cluster where a submitted feedback has been classified by the system. Additionally, the type of suggested resolution may also be based on the level of similarity of a feedback report with other feedback reports classified into a common feedback cluster.

In this way, the system is able to expeditiously suggest an appropriate actionable resolution to a user based on the classification of the user's feedback into a feedback cluster. This improves feedback flow for application issue reporting and consequently improves user experience.

In some aspects of the subject technology, feedback classification can be performed on a client device operated by a user. In other aspects, feedback classification can be performed at one or more servers. In yet other aspects, feedback classification can be performed entirely or in part by one or more human classifiers. As an example, the human classifiers may, individually or as a group, identify topics upon review of feedback received from client devices and classify the feedback into a feedback cluster. The disclosed system can then provide an appropriate resolution for an issue based on the classification.

FIG. 1 illustrates example architecture 100 for providing an actionable resolution for a software application feedback submission. Architecture 100 includes servers 130 and clients 110 connected over network 150.

Servers 130 can include devices having an appropriate processor, memory, and communications capability. Network 150 can include, for example, any one or more of a personal area network (PAN), a local area network (LAN), a campus area network (CAN), a metropolitan area network (MAN), a wide area network (WAN), a broadband network (BBN), the Internet, and the like. Further, network 150 can include, but is not limited to, any one or more of the following network topologies, including a bus network, a star network, a ring network, a mesh network, a star-bus network, tree or hierarchical network, and the like.

Clients 110 can be, for example, desktop computers, laptop computers, mobile devices (e.g., a smartphone, tablet computer, or PDA), set top boxes (e.g., for a television), video game consoles, or any other devices having appropriate processor, memory, and communications capabilities. Each of clients 110 is configured to execute applications that can be, for example, search applications, web browsers, reading applications, communication applications, or any other software application. In some aspects of the subject technology, the disclosed system may be provided as a feedback submission menu within an application (e.g., a web browser). The feedback submission menu enables a user to report an application issue (e.g., malware, suspended responsiveness, etc.) and receive actionable resolutions that may be used by the user to resolve the issue. Users may also provide feature suggestions and complaints using the feedback submission menu.

Figure 2:
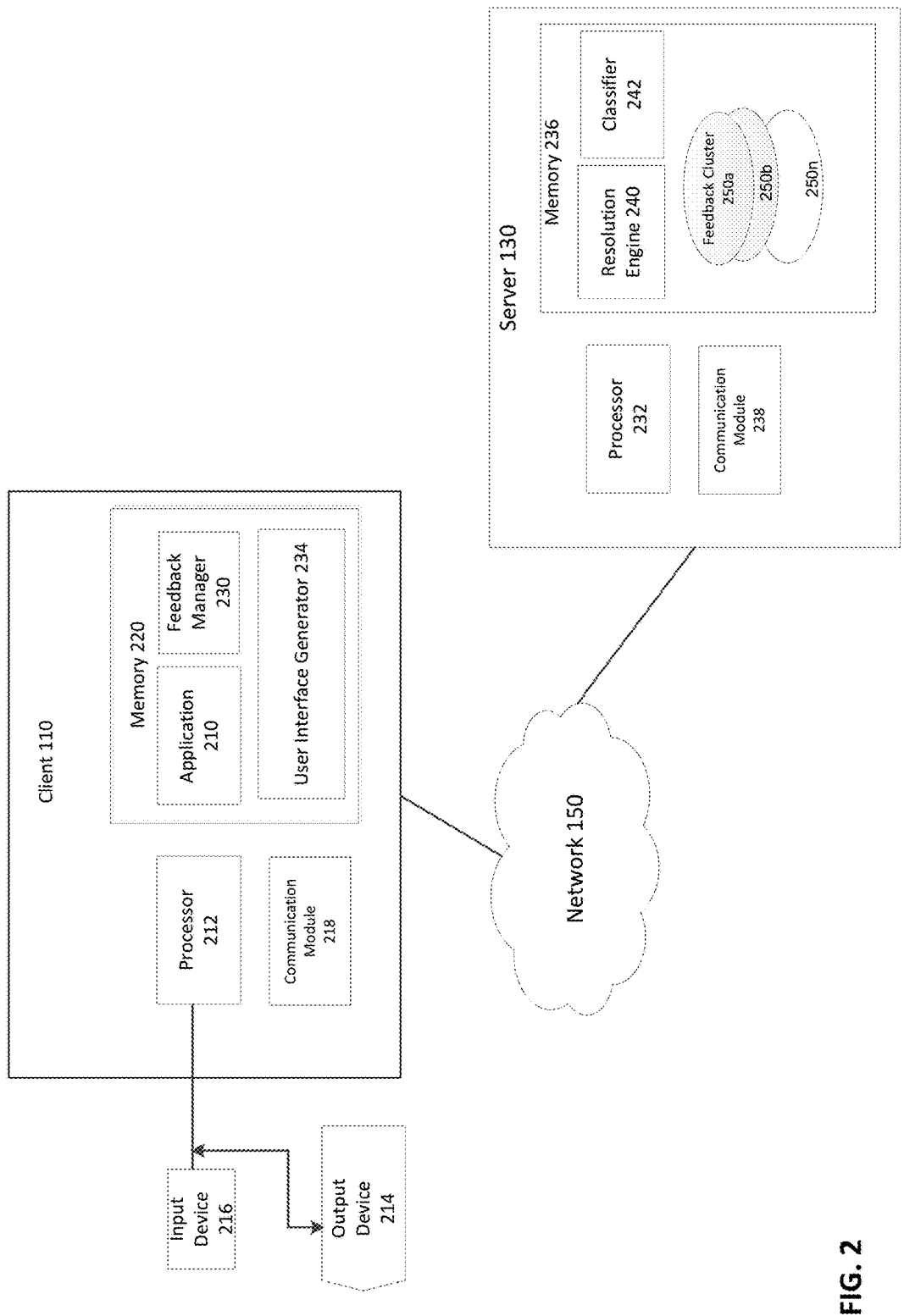
FIG. 2 is a block diagram illustrating an example client and server from the architecture of FIG. 1 according to an aspect of the disclosure.

FIG. 2 is a block diagram illustrating an example client 110 and server 130 in the architecture 100 of FIG. 1 in greater detail according to certain aspects of the disclosure.

Client 110 includes processor 212, communication module 218 and memory 220. Memory 220 includes application 210, user interface generator 234 and feedback manager 230. Output device 214 can include a touch screen display or any other graphic display. Client 110 also includes input device 216, such as a keyboard, touchscreen, or mouse, to receive user input. Feedback manager 230 can be configured to run on client 110 that may be mobile or non-mobile. Processor 212 of client 110 can be configured to execute instructions, such as instructions physically coded into processor 212 and instructions received from software (e.g., feedback manager 230) in memory 220. For example, processor 212 of client 110 executes instructions from feedback manager 230 to enable a user to report an application issue (e.g., malware, suspended responsiveness, etc.) and receive actionable resolutions that may be used by the user to resolve the issue.

Server 130 includes processor 232, communication module 238 and memory 236. Memory 236 further includes resolution engine 240, classifier 242 and feedback clusters 250a-n. Feedback clusters 250a-n may be associated with their respective issue topics and keywords. Feedback clusters 250a-n may also be associated with respective resolutions that are stored by resolution engine 240 in memory 236. Processor 232 of server 130 can be configured to execute instructions, such as instructions physically coded into processor 232 and instructions received from software (e.g., resolution engine 240) in memory 236. For example, processor 232 of server 130 executes instructions from resolution engine 240 to identify one or more issue topics from the feedback report provided by client 110.

Client 110 and server 130 are connected over network 150 via respective communications modules 218 and 238. The communications modules 218 and 238 are configured to interface with the network 150 to send and receive information, such as data, requests, responses, and commands to other devices on the network. Communications modules 218 and 238 can be, for example, modems or Ethernet cards. In an example, data related to feedback submissions and resolutions is exchanged between client 110 and server 130 over network 150.

In some aspects of the subject technology, user interface manager 234 can display a user interface to a user based on selections provided by the user. For example, when the user selects an application menu button to provide feedback, user interface manager 234 in memory 220 detects the selection and displays a feedback form to the user. When the user provides feedback and indicates completion of the user's feedback (e.g., via a submit button), user interface manager 234 detects the indication and provides the completed feedback form to feedback manger 230. Then, when feedback manager 230 receives feedback resolutions from resolution engine 240, user interface manager 234 may be instructed by feedback manager 230 to generate a user interface to display a resolution at application 210.

User interface manager 234 may also dynamically generate user interfaces guiding the user through one or more steps in a feedback submission process in accordance with instructions that may be received from feedback manager 230. For example, if during a feedback submission process a user provides an indication to view a preview of the user's feedback, user interface manager 234 can generate a feedback preview and display the preview to the user. Example user interfaces that can be generated by user interface manager 234 are discussed further below with respect to FIG. 4.

When a feedback is provided to the resolution engine 240 by feedback manager 230, resolution engine 240 may provide one or more instructions to classifier 242 to classify feedback received from feedback manager 230. Classifier 242 may parse, using text or character recognition at least one of feedback description keywords, the system log, the application state log, the image or screenshot of the application and the summary of device information. From this parsing of submitted feedback, classifier 242 may identify issue topics that are used to automatically classify the submitted feedback into one or more of feedback clusters 250a-n.

In some aspects of the subject technology, classifier 242 may use statistical classification, vector classification or any other form of content classification mechanism to automatically classify the submitted feedback into one or more of feedback clusters 250a-n. Classification performed by classifier 242 may also include use of machine learning techniques. Classifier 242 can enable feedback to be indexed and classified by subject or area of application feature and can be helpful to resolution engine 240 to provide a resolution based on the feedback.

In some aspects of the subject technology, classifier 242 can review a database of software issue headings or classifications and assign the headings or the classifications to feedback received from feedback manager 230 based on feedback context (or keywords) determined by classifier 242. Such a database of issue headings and classifications may be stored in memory 236 of server 130 from where it may be accessed by classifier 242.

In some aspects of the subject technology, there may be hundreds or thousands of software issue headings and classifications or any other number of classifications accessible to classifier 242. In an aspect, classifier 242 can be instructed by resolution engine 240 to assign one or more classification headings (or codes) to feedback reports received from feedback manager 230 based on a subject and/or context of the feedback report. A subject or context of the feedback report may be determined based on parsing and recognizing text from at least one of feedback description keywords, the system log, the application state log, the image or screenshot of the application and the summary of device information. As an example, headings or classifications may be associated with different types of issues. For example, classifier 242 may assign a heading of "crash" to feedback provided by the user if classifier determines that the word "crash" appears in the feedback description received from feedback manager 230. This example is illustrative and is not intended to limit aspects of the disclosed technology.

In some aspects of the subject technology, classification codes available to classifier 242 may overlap, however, any association between the classification codes may be derived by classifier 242 from different or unrelated issue contexts. In an aspect, classifier 242 can store, in memory 236 of server 130, a data structure of associations between various classifications, issue contexts and classification codes. Classifier 242 may read any such associations from memory 236 during classification by classifier 242.

In some aspects, classifier 242 may construct a vector space model based on an occurrence of each word in a group of feedback reports comprising 'n' words. Classifier 240 may then construct a vector having 'n' elements with values representing the weight (e.g., frequency of occurrence) of each word. As a non-limiting example, relationship of a feedback report to a feedback cluster of feedback clusters 250a-n may be determined by classifier 242 based on a function (e.g., cosine of an angle) between a vector which characterizes a feedback report and a vector which characterizes the cluster. If, for example, the value (e.g., similarity score) determined by the function is greater than a predetermined threshold, the feedback report may be classified into the cluster. Example operations of classifier 242 discussed above are purely illustrative and are not intended to limit the present disclosure. Additional methods for feedback classification may be used by classifier 242 including, but not limited to, decision trees, linear classification and probabilistic methods.

In some aspects of the subject technology, classifier 242 may compare one or more issue topics identified from a feedback report with existing issue topics included in one or more feedback clusters 250a-n to determine respective similarity scores for the one or more feedback clusters 250a-n. Classifier 242 may then classify the feedback report into a feedback cluster (e.g., 250a) based on at least the determined similarity scores. For example, classifier 242 may classify the feedback report into feedback cluster 250a when the feedback cluster 250a has a higher determined similarity score in comparison to similarity scores of other feedback clusters 250b-n. Feedback cluster 250a can include issue topics (e.g., issue word combinations, characters or character combinations) similar to the identified issue topics, such as those reported by other users, along with their respective identified issue topics and resolutions.

Feedback cluster 250a may also include images, such as application screenshots. In some aspects of the subject technology, similarity between a submitted screenshot and other existing screenshots in feedback cluster 250a may be determined based on a similarity between pixel patterns or parameters in the submitted screenshot and pixel patterns and parameters in existing screenshots in feedback cluster 250a. If two screenshots are determined to be similar based on pixel patterns or parameters, this may suggest that they are associated with similar software application issues enabling the disclosed system to classify the screenshots into an identical feedback cluster or further refine an initial classification based on keyword descriptions.

In some aspects of the subject technology, classifier 242 can provide one or more classification signals to resolution engine 240. Such classification signals may include an identification of a feedback cluster (e.g., feedback cluster 250a) where a feedback has been classified by classifier 242. Based on the classification signals provided by classifier 242, resolution engine 240 provides a resolution for an application issue reported by the user.

In an aspect of the disclosure, resolution engine 240 retrieves one or more resolutions associated with a feedback cluster (e.g., feedback cluster 250a) into which a feedback report has been classified. In this way, when a feedback report is received from feedback manager 230, resolution engine 240 may retrieve a resolution from memory 236 of server 130 and provide the resolution to feedback manager 230.

As noted above, feedback clusters 250a-n may be associated with respective resolutions that are stored by resolution engine 240 in memory 236. As an example, the association may include a pointer from the feedback cluster to a memory location including the resolution or instructions causing execution of the resolution. These resolutions may be stored in a data structure or any other database in memory 236. As illustrative examples, the resolutions may be stored as text data or even as codes that point to other databases or data structures that include resolution text or instructions. For example, a resolution code may be any numeric or alpha numeric code that serves as a pointer to resolution text or instructions in memory 236. For example, consider a feedback cluster that includes the words "clear browser history." This feedback cluster may be associated with resolution that includes providing a button to clear browser history.

Returning to example resolutions provided by resolution engine 240, in one scenario based on the classification, a resolution suggested by resolution engine 240 may include an action button that when selected by the user causes the application (e.g., application 210) to execute an operation immediately resolving the issue. Such an action button can be provided when the operation to resolve the issue is integrated within and available to the application.

In another scenario based on the classification, a resolution suggested by resolution engine 240 can include one or more instructions (e.g., a step-by-step guide) to resolve the issue. A step-by-step guide may be provided when a resolution may not be directly accessible through an action button.

In yet another scenario based on the classification, a suggested resolution by resolution engine 240 can include a link to a web-based help center or forum page related to the application that caused the issue. Such a link may be provided when an action button and a step by step guide to resolve the issue is not available or applicable.

It is to be appreciated that the example resolutions noted above may be provided individually or in any combination by resolution engine 240.

As an example, the type of suggested resolution (e.g., action button, step by step instructions or help center link) is based on existing feedback resolutions available in feedback cluster 250a where a submitted feedback has been classified by classifier 242. Additionally, the type of suggested resolution may also be based on a level of similarity of a feedback report with other feedback reports classified into a common feedback cluster.

In this way, the system is able to expeditiously suggest an appropriate actionable resolution to a user based on classification of the user's feedback into a feedback cluster. This improves feedback flow for application issue reporting and consequently improves user experience.

In some aspects of the subject technology, one or more resolutions determined by resolution engine 240 are transmitted over network 150 to feedback manager 230 at client 110. In other aspects, resolution engine 240 may provide a resolution code to feedback manager 230. Feedback manager 230 may then determine the resolution by a look-up of the resolution code in a data structure residing in memory 220. Once the resolution has been determined by feedback manger 230 through the look-up, feedback manager 230 can provide one or more instructions to user interface generator 234 to display the resolution to a user using output device 214. In some aspects, resolution engine 240 is capable of transmitting resolutions or resolution codes simultaneously to one or more clients 110.

In some aspects, as resolutions are provided by resolution engine 240, the resolutions for issues can be associated with one or more feedback clusters 250a-n. In this way, feedback cluster 250a-n may continue to be supplemented with new resolutions for software issues. In addition, resolution engine 240 may also refine any existing resolutions that may be associated with feedback clusters 250a-n. Such refinement may include, for example, addition of new resolutions, removal of existing resolutions or editing of existing resolutions.

Furthermore, feedback clusters 250a-n can be kept current by resolution engine 240 with resolutions for most recent or previously unknown issues included in feedback reports. Once resolutions for new or previous issues have been determined, these resolutions may be provided by resolution engine 240 when the same or similar issues are reported again. For example, when a previously unknown issue arrives at resolution engine 240, the resolution engine 240 may instruct classifier 242 to classify the previously unknown issue in one or more of feedback clusters 250a-n. Classifier 242 proceeds to classify the previously unknown issue using one or more of classification methods discussed above. Once the previously unknown issue has been classified, resolution engine 240 can select a resolution from one or more resolutions associated with the feedback cluster where the issue has been classified.

In this way, resolution engine 240 is able to suggest meaningful and current resolutions for issues reported by users.

In some non-limiting aspects of the subject technology, feedback classification and resolution can be performed on a client device operated by a user. For example, resolution engine 240, classifier 242 and feedback clusters 250a-n may reside and operate at client 110. In other aspects of the subject technology, and as shown in FIG. 2, feedback classification and resolution can be performed at a server. In yet other aspects of the subject technology, feedback classification can be performed entirely or in part by one or more human classifiers. As an example, the human classifiers may, individually or as a group, identify topics upon review of feedback received from client devices and classify the feedback into a feedback cluster. Resolution engine 240 can then provide an appropriate resolution for an issue based on the classification.

Figure 3:
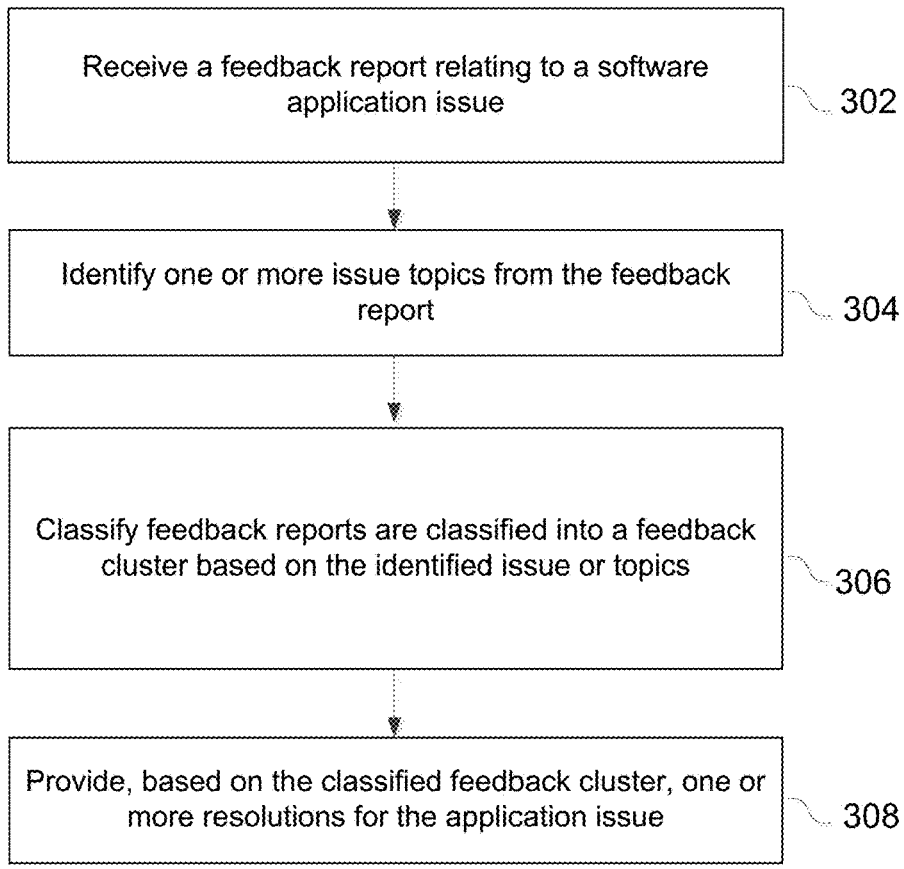
FIG. 3 illustrates an example process for providing a resolution for a software application feedback submission.

FIG. 3 illustrates an example process 300 for expeditiously providing an actionable resolution for an application feedback submission at the example client 110 of FIG. 2. While FIG. 3 is described with reference to FIG. 2, it should be noted that the process steps of FIG. 3 may be performed by other systems.

The process 300 begins when a feedback report relating to a software application issue is received in step 302. As an example, resolution engine 240 in server 130 may receive a submitted feedback report for an application issue that may include one or more of a feedback description, a system log, an application state log, an image or screenshot of the application and a summary of user device information. Such feedback may be submitted through a feedback form instantiated by user interface manager 234 at client 110. In some aspects of the subject technology, user interface manager 234 may instantiate the feedback form upon selection of a feedback submission menu or a feedback reporting button at application 210. Some aspects of the feedback other than the feedback description (e.g., a system log and screenshots) may be automatically included into the feedback by feedback manger 230. For example, feedback manger 230 may access a system log of any other device level data structure from memory 220 to retrieve and include data from the system log into the feedback.

Process 300 proceeds by identifying one or more issue topics from the feedback report in step 304. As an example, classifier 242 may parse information included in the feedback report. The information may include one or more of feedback report description words, a system log, an application state log, a system information log and an application screenshot. Any text or word recognition technique may be used to parse and identify keywords and other text included within the feedback report description words, the system log, the application state log, the system information log and the application screenshot.

The feedback reports are classified in step 306 into a feedback cluster based on the identified issue or topics. As an example, classifier 242 may classify the feedback reports into feedback cluster 250a. As discussed above, resolution engine 240 may provide one or more instructions to classifier 242 to classify feedback received from feedback manager 230. Classifier 242 may then proceed to classify the feedback in one or more of feedback clusters 250a-n.

Process 300 then provides, based on the classified feedback cluster, one or more resolutions for the application issue in step 308. For example, resolution engine 240 may retrieve a resolution from memory 236 of server 130 and provide the resolution to feedback manager 230.

As an example, the type of suggested resolution (e.g., action button, step by step instructions or help center link) can be based on existing feedback resolutions available in a feedback cluster where a submitted feedback has been classified by the system. Additionally, the type of suggested resolution may also be based on a level of similarity of a feedback report with other feedback reports classified into a common feedback cluster or may be based on any other heuristic or method utilized by classifier 242.

In this way, the system is able to expeditiously suggest an appropriate actionable resolution to a user based on the classification of the user's feedback into a feedback cluster. This improves feedback flow for application issue reporting and consequently improves user experience.

Figure 4:
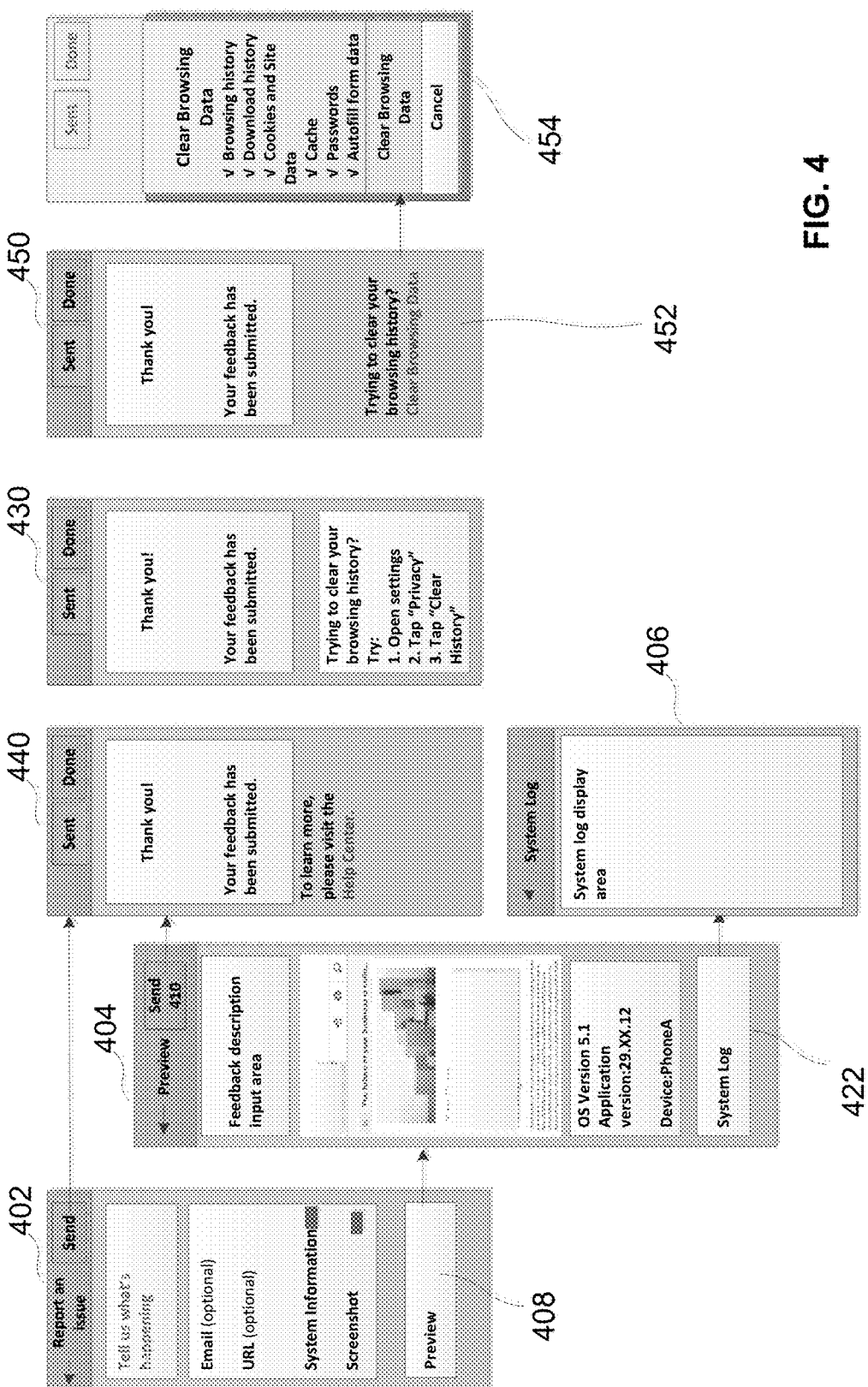
FIG. 4 is an example illustration associated with the process of FIG. 3.

FIG. 4 illustrates an example user interface for enabling a user to submit application feedback and receive actionable feedback resolutions, according to aspects of the subject technology. The example user interfaces discussed herein can be generated by user interface generator 234.

Interface 402 illustrates an example feedback form that enables a user to provide feedback and report issues associated with applications. Interface 402 may also enable a user to provide an email address and a URL (or any identifier) associated with the issue together with a description of the issue or feedback. In some aspects of the subject technology, user interface manager 234 may instantiate the feedback form 402 upon selection of a feedback submission menu or a feedback reporting button at application 210 by a user. Some aspects of the feedback other than the feedback description (e.g., a system log and screenshots) may be automatically included into the feedback by the user's device.

Interface 402 also includes a preview button 408 that enables the user to preview feedback and descriptions that may have been provided by the user prior to submitting feedback. In an example scenario where the user selects preview button 408, interface 404 can be instantiated by user interface manager 234 upon selection of button 408. Interface 402 is purely illustrative and is not intended to limit the present disclosure.

Interface 404 includes a preview of feedback that is to be submitted and a screenshot of the application user interface at the time the issue occurred. Additionally, interface 404 may include an operating system version, application version (e.g., browser version number) and a device manufacturer model number and name. Interface 404 can also include system log button 422 that when selected causes display of system log 406. System log 406 can include, but is not limited to, events that are logged by the operating system components. The system log may include information related to device changes, device drivers, system changes, events, operations and any other data associated with device operation.

Returning to interface 404, selection of send button 410 causes the user feedback to be submitted and at least one of resolution interfaces 430, 440 and 450 are immediately displayed to the user by user interface manager 234. As noted above, in some aspects of the subject technology, one or more resolutions determined by resolution engine 240 are transmitted over network 150 to feedback manager 230 at client 110. Feedback manager 230 may provide one or more instructions to user interface generator 232 to display the one or more resolutions at client 110.

In one example scenario, a suggested resolution 450 may include an action button or link 452 that when selected by the user causes the application to execute an operation immediately resolving the issue. Such an action button can be provided when the operation to resolve the issue is integrated within and available to the application. Interface 454 illustrates an example interface that appears after a user selects the action button or link 452. In this example, the user is provided with an actionable resolution that enables the user to clear browsing data.

In another example scenario, a suggested resolution 430 can include one or more instructions (e.g., a step-by-step guide) to resolve the issue. A step-by-step guide may be provided when a resolution may not be directly accessible or available through an action button.

In yet another scenario, a suggested resolution 440 can include a link to a web-based help center or forum page related to the application that caused the issue. Such a link may be provided when an action button and a step-by-step guide (or one or more instructions) to resolve the issue is not available or applicable.

As an example, the type of suggested resolution (e.g., action button, step-by-step instructions or help center link) can be based on existing feedback resolutions available in a feedback cluster where a submitted feedback has been classified by the system. Additionally, the type of suggested resolution may also be based on the level of similarity of a feedback report with other feedback reports classified into a common feedback cluster.

Figure 5:
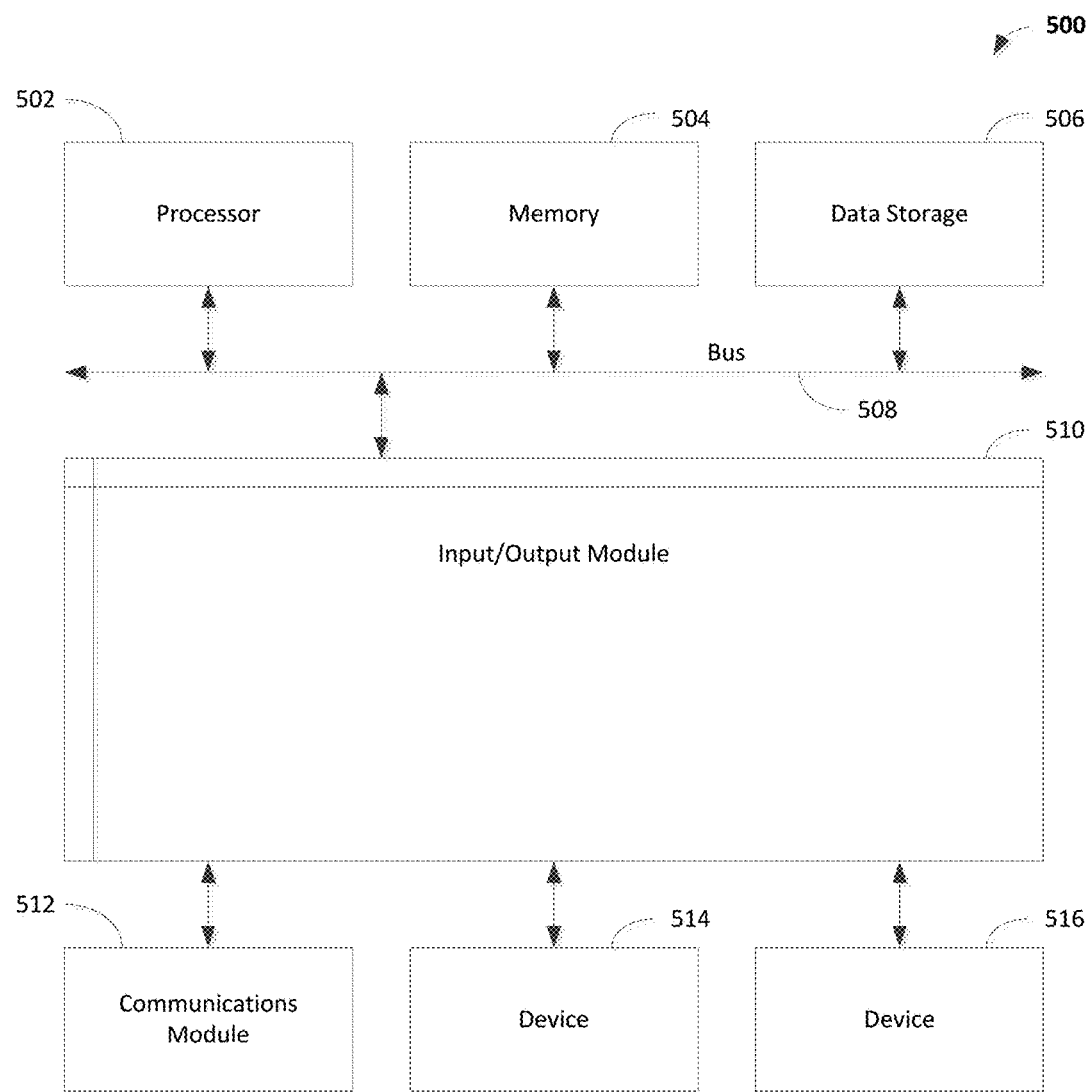
FIG. 5 conceptually illustrates an example electronic system in which some configurations are implemented.

FIG. 5 is a block diagram illustrating an example computer system 500 with which client 110 and server 130 of FIG. 2 can be implemented. In certain aspects, the computer system 500 may be implemented using hardware or a combination of software and hardware, either in a dedicated server, or integrated into another entity, or distributed across multiple entities.

Computer system 500 (e.g., client 110 and server 130) includes a bus 508 or other communication mechanism for communicating information, and a processor 502 (e.g., processor 212 and 232) coupled with bus 508 for processing information. By way of example, the computer system 500 may be implemented with one or more processors 502. Processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504 (e.g., memory 220 and 250), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. Processor 502 and memory 504 can be supplemented by, or incorporated in, special purpose logic circuitry.

The instructions may be stored in memory 504 and implemented in one or more computer program products, i.e., one or more modules of computer program instructions encoded on a computer readable medium for execution by, or to control the operation of, the computer system 500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages.

Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Example input/output modules 510 include data ports such as USB ports. The input/output module 510 is configured to connect to a communications module 512. Example communications modules 512 (e.g., communications module 218 and 238) include networking interface cards, such as Ethernet cards and modems. In certain aspects, the input/output module 510 is configured to connect to a plurality of devices, such as an input device 514 (e.g., input device 216) and/or an output device 516 (e.g., output device 214). Example input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 516 include display devices, such as a LED (light emitting diode), CRT (cathode ray tube), or LCD (liquid crystal display) screen, for displaying information to the user.

According to one aspect of the present disclosure, client 110 and server 130 can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computing system 500 can include clients and servers. A client and server are generally remote from each other and typically interact through a communication network. The relationship of client and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions or data to processor 502 for execution. Such a medium may take many forms, including, but not limited to, non-volatile media, volatile media, and transmission media. Non-volatile media include, for example, optical disks, magnetic disks, or flash memory, such as data storage device 506. Volatile media include dynamic memory, such as memory 504. Transmission media include coaxial cables, copper wire, and fiber optics, including the wires that comprise bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Furthermore, to the extent that the term "include," "have," or the like is used in the description or the claims, such term is intended to be inclusive in a manner similar to the term "comprise" as "comprise" is interpreted when employed as a transitional word in a claim.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

These and other implementations are within the scope of the following claims.

What is claimed is:

1. A computer-implemented method for feedback submission resolution, the method comprising:
   identifying respective resolutions for software application issues, the respective resolutions comprising an executable operation that resolved a respective software issue;
   receiving a feedback report relating to a software application issue, the feedback report comprising an image;
   automatically parsing the image of the feedback report using text or character recognition without user intervention, and comparing one or more pixel patterns or parameters of the image with one or more pixel patterns or parameters of other images;
   identifying, without user intervention based on the automatically parsing of the image, one or more issue topics from the feedback report;
   classifying, automatically without user intervention, the feedback report into a feedback cluster of one or more feedback clusters based on the identified one or more issue topics and the comparing of the one or more pixel patterns or parameters of the image, the feedback clusters being associated with the respective resolutions for software application issues;
   retrieving one or more resolutions associated with the classified feedback cluster; and
   providing, to a user interface associated with the feedback report, the retrieved one or more resolutions for the software application issue, including a control for initiating execution of the executable operation to resolve the software application issue.

2. The computer-implemented method of claim 1, wherein the identifying further comprises:
   parsing information included in the feedback report, the information comprising one or more of feedback report description words, a system log, an application state log, a system information log.

3. The computer-implemented method of claim 1, wherein the classifying further comprises:
   comparing the identified issue topics with existing issue topics included in one or more feedback clusters to determine a similarity score for the one or more feedback clusters; and
   classifying the feedback report into the feedback cluster based on at least the determined respective similarity scores.

4. The computer-implemented method of claim 3, further comprising:
   classifying the feedback report into the feedback cluster when the feedback cluster has a higher determined similarity score in comparison to the respective similarity scores of other feedback clusters.

5. The computer-implemented method of claim 1, wherein the image comprises an application screenshot captured at a time when the feedback report is generated, the method further comprising:
   comparing one or more pixel patterns or parameters associated with the application screenshot with one or more pixel patterns or parameters of one or more other application screenshots in one or more feedback clusters to determine respective similarity scores for the one or more feedback clusters; and
   classifying the feedback report into a respective feedback cluster based on at least the determined respective similarity scores.

6. The computer-implemented method of claim 1, further comprising:
   identifying existing feedback clusters prior to the classifying, wherein the identified existing feedback clusters include issue topics similar to the identified issue topics.

7. The computer-implemented method of claim 1, wherein the control comprises:

an action button that when selected by a user causes execution of the executable operation.

8. The computer-implemented method of claim 5, further comprising:
receiving instructions to display one or more of:
one or more instructions to resolve the software application issue; and
a link to a web-based help center that when selected by a user causes an application to render a help center page.

9. A non-transitory machine-readable medium comprising instructions stored therein, which when executed by a processor, causes the processor to perform operations comprising:
identifying one or more respective resolutions for software application issues, the one or more respective resolutions comprising an executable operation that resolved a respective software issue;
receiving a feedback report relating to a software application issue, the feedback report comprising an image;
automatically parsing the image of the feedback report based on text or character recognition without user intervention, and comparing one or more pixel patterns or parameters of the image with one or more pixel patterns or parameters of other images;
identifying, without user intervention based on the automatically parsing of the image, one or more issue topics from the feedback report;
classifying, automatically without user intervention, the feedback report into a feedback cluster based on the identified one or more issue topics and the comparing of the one or more pixel patterns or parameters of the image, the feedback cluster being associated with the one or more respective resolutions; and
providing, based on the classified feedback cluster, instructions to display an action button, the action button when selected by a user causing execution of an operation resolving the software application issue, including a control for initiating execution of the executable operation to resolve the software application issue.

10. The non-transitory machine-readable medium of claim 9, wherein the identifying further includes:
parsing information included in the feedback report, the information comprising one or more of feedback report description words, a system log, an application state log, a system information log.

11. The non-transitory machine-readable medium of claim 9, the classifying further comprising:
comparing the identified issue topics with existing issue topics included in one or more feedback clusters to determine a similarity score for the one or more feedback clusters; and
classifying the feedback report into the feedback cluster based on at least the determined respective similarity scores.

12. The non-transitory machine-readable medium of claim 11, further comprising:
classifying the feedback report into the feedback cluster when the feedback cluster has a higher determined similarity score in comparison to the respective similarity scores of other feedback clusters.

13. The non-transitory machine-readable medium of claim 9, wherein the image comprises an application screenshot, the classifying further comprising:
comparing one or more pixel patterns or parameters associated with the application screenshot with one or more pixel patterns or parameters of one or more other application screenshots in one or more feedback clusters to determine respective similarity scores for the one or more feedback clusters; and
classifying the feedback report into the feedback cluster based on at least the determined respective similarity scores.

14. The non-transitory machine-readable medium of claim 9, further comprising:
identifying existing feedback clusters prior to the classifying, wherein the identified existing feedback clusters include issue topics similar to the identified issue topics.

15. The non-transitory machine-readable medium of claim 9, wherein the providing further comprises:
providing at least one of:
one or more instructions to resolve the software application issue; and
a link to a web-based help center that when selected by the user causes an application to render a help center page.

16. A system comprising:
a non-transitory machine-readable memory comprising instructions; and
a processor configured to execute the instructions to:
identify one or more respective resolutions for software application issues, the one or more respective resolutions comprising an executable operation that resolved a respective software issue;
receive a feedback report relating to a software application issue, the feedback report comprising an image;
automatically parse the image of the feedback report based on text or character recognition without user intervention, and compare one or more pixel patterns or parameters of the image with one or more pixel patterns or parameters of other images;
identify, without user intervention based on the automatically parsing of the image, one or more issue topics from the feedback report;
classify, automatically without user intervention, the feedback report into a feedback cluster based on the identified one or more issue topics and the comparing of the one or more pixel patterns or parameters of the image, the feedback cluster being associated with the one or more respective resolutions; and
provide, based on the classified feedback cluster, instructions to display an action button, the action button when selected by a user causing execution of an operation resolving the software application issue, including a control for initiating execution of the executable operation to resolve the software application issue.

17. The system of claim 16, wherein the processor is further configured to execute the instructions to:
parse information included in the feedback report, the information comprising one or more of feedback report description words, a system log, an application state log, a system information log and an application screenshot.

18. The system of claim 16, wherein the processor is further configured to execute the instructions to:
compare the identified issue topics with existing issue topics included in one or more feedback clusters to determine a similarity score for the one or more feedback clusters; and
classify the feedback report into the feedback cluster based on at least the determined respective similarity scores.

19. The system of claim 18, wherein the processor is further configured to execute the instructions to:
classify the feedback report into the feedback cluster when the feedback cluster has a higher determined similarity score in comparison to the respective similarity scores of other feedback clusters.

* * * * *